(12) United States Patent
Windel

(10) Patent No.: US 7,152,269 B1
(45) Date of Patent: Dec. 26, 2006

(54) WASHING DEVICE FOR A CAR WASH UNIT

(75) Inventor: Günter Windel, Schöllkrippen (DE)

(73) Assignee: Washtec Holding GmbH, Augsburg (DE)

( * ) Notice: Subject to any disclaimer, the term of this patent is extended or adjusted under 35 U.S.C. 154(b) by 404 days.

(21) Appl. No.: 10/088,717

(22) PCT Filed: Sep. 19, 2000

(86) PCT No.: PCT/EP00/09166

§ 371 (c)(1),
(2), (4) Date: Jul. 26, 2002

(87) PCT Pub. No.: WO01/21037

PCT Pub. Date: Mar. 29, 2001

(30) Foreign Application Priority Data

Sep. 20, 1999 (DE) .......................... 299 16 541 U

(51) Int. Cl.
*B60S 3/06* (2006.01)

(52) U.S. Cl. .......................... 15/181; 15/53.2; 15/97.3; 15/179; 15/230.16

(58) Field of Classification Search ...... 15/4, 15/5, 53.2, 97.3, 179, 181–183, 230, 230.14, 15/230.16, 230.17, 230.19, DIG. 5, DIG. 6
See application file for complete search history.

(56) References Cited

U.S. PATENT DOCUMENTS

| | | | | |
|---|---|---|---|---|
| 1,856,289 A | * | 5/1932 | Owens | 15/181 |
| 3,181,193 A | * | 5/1965 | Nobles et al. | 15/114 |
| 3,761,986 A | * | 10/1973 | Rickel | 15/53.3 |
| 4,153,967 A | * | 5/1979 | Thoma | 15/181 |
| 4,338,698 A | * | 7/1982 | Beer et al. | 15/230.16 |
| 4,377,878 A | * | 3/1983 | Pecora | 15/97.3 |
| 4,756,044 A | * | 7/1988 | Clark | 15/182 |
| 4,815,158 A | * | 3/1989 | Crotts | 15/53.2 |
| 5,592,712 A | | 1/1997 | Favagrossa | 15/179 |
| 5,813,076 A | * | 9/1998 | Belanger et al. | 15/97.3 |
| 5,884,356 A | * | 3/1999 | Zigerlig | 15/230.16 |

FOREIGN PATENT DOCUMENTS

| | | |
|---|---|---|
| DE | 92 14 265 U1 | 3/1993 |
| DE | 93 01 692 U1 | 7/1994 |
| DE | 196 47 783 A1 | 5/1997 |
| DE | 298 10 934 U1 | 8/1998 |
| EP | 0 876 778 A1 | 11/1998 |

* cited by examiner

*Primary Examiner*—Mark Spisich
(74) *Attorney, Agent, or Firm*—Martin Fleit; Paul D. Bianco; Fleit Kain Gibbons Gutman Bongini & Bianco P.L.

(57) ABSTRACT

The invention relates to a washing device, in particular a wash brush for car wash units, which is rotationally or peripherally positioned and powered. The washing device has several essentially horizontal projecting, bristle type wash elements located at its periphery and several strip-shaped wash elements which are arranged in an alternating fashion. The bristle-shaped wash elements are longer and harder than the strip shaped wash elements. The strip-shaped wash elements can be made of a closed pore foam material or a fiber material. The wash elements can be arranged in an alternating fashion in the peripheral direction and/or the axial direction.

23 Claims, 4 Drawing Sheets

WASHING DEVICE FOR A CAR WASH UNIT

FIELD OF THE INVENTION

The invention concerns a rotating or revolving washing device, especially a scrub brush for car wash units.

BACKGROUND OF THE INVENTION

Such a scrub brush is known from U.S. Pat. No. 4,377,878. At the periphery of the shaft of the scrub brush, soft pliant wash elements made from felt and stiff bristles are arranged in an alternating manner in the circumferential direction. The bristles are distinctly shorter than the wash elements and serve as support elements for them. The bristles are not involved in the washing process, nor are they washing elements. The washing of the vehicle is accomplished only by the soft pliant wash elements made of felt or another fibrous material. Although such wash elements are advantageous when used for gently washing a vehicle, they do not provide an optimal cleaning action.

German Utility Model DE-U-92 14 265 shows a scrub brush with a mixture of bristle-like coarse wash elements and strip-like soft wash elements made from a fibrous web. The scrub brush here is divided into several segments along its length, and the different wash elements alternate in the axial direction of the brush. There are bristles at the upper and lower region of the vertical side brush, while the softer fibrous web strips are arranged in the center region. The bristles and the fibrous web strips have the same length here. The bristles possess good cleaning ability and are even able to loosen and remove stuck-on dirt, but there is the danger of them causing minor damage to the surface being cleaned.

A similar scrub brush is known from U.S. Pat. No. 3,613,140. This is designed as a horizontal wheel washing brush and consists of various wash elements, which differ in material and length and are arranged in an alternating manner in the lengthwise direction of the brush. The longer wash elements are supposed to reach the insides of the vehicle's wheel or rim and consist of a soft bristle-like material. The shorter and likewise bristle-like wash elements are supposed to clean the exterior wheel and rim areas and are harder or stiffer than the longer bristles. They should consist of nylon or metal wire.

German Utility Model DE-U-93 01 692 shows another vertical side brush, which is designed similar to the aforesaid side brush of DE-U-92 14 265. Here as well, the side brush has only bristles in the lower region and textile strips in the upper region; furthermore, shorter supporting bristles can be arranged. The bristles and textile strips have the same length, while the bristles for the support function can also be shorter.

European Patent Application EP-A-0876778 shows a washing device for car wash units that has bristles of different length, and these bristles may also have different stiffnesses.

Therefore, the problem is to modify a generic washing device so that an improved and more thorough washing of vehicles is made possible.

SUMMARY OF THE INVENTION

The present invention relates to a washing device, such as a scrub brush, that can be mounted on a shaft to rotate and/or moved in a linear direction. The washing device has several essentially transverse spaced bristle-like and strip-like wash elements on its periphery. These wash elements are arranged in an alternating manner in the circumferential direction and/or in the axial direction and the bristle-like wash elements have a greater length than the strip-like wash elements. The bristle-like wash elements are also coarser than the strip-like wash elements. In one embodiment, the bristle-like wash elements in the stretched-out condition are around five cm longer than the strip-like wash elements.

The strip-like wash elements can be made of a plastic foam, preferably a closed-pore polyethylene foam, or a fiber material, preferably cloth or felt. The strip-like wash elements can be made of individual thin strips or of cloths with slits.

The wash elements can be secured to groove rings located on the shaft, with the bristle-like wash elements configured as bristle tufts and consisting of a thread-like plastic material, preferably polyethylene, polyamide or polypropylene. The groove rings can be arranged in a twist-lock manner on the shaft.

In one embodiment, the bristle-like and strip-like wash elements are arranged in a lower region of a scrub brush rotating about an essentially vertical axis. For example, the wash elements can be fastened to the lower groove rings, preferably to the bottom four groove rings of the scrub brush. In another embodiment, the bristle-like and strip-like wash elements are arranged in two marginal areas of a scrub brush rotating about an essentially horizontal axis.

The washing device can be provided with twelve rows of bristle-like wash elements and twelve rows of strip-like wash elements arranged in uniform alternation and distributed about the circumference on the individual groove ring. An individual bristle row can have six bristle tufts, each with 36 threads, for example.

The washing device can be made so that the bristle-like wash elements are fastened in radial openings on the shaft or the groove ring and arranged between axial grooves, which are designed to accommodate the strip-like wash elements. The bristle-like wash elements and the strip-like wash elements can each be arranged in bundles or individually and are uniformly distributed peripherally and axially, and the bundles are secured in their own radial openings on the shaft or the groove ring. Alternatively, the bristle-like wash elements and the strip-like wash elements are secured in common radial openings on the shaft or the groove ring.

DETAILED DESCRIPTION OF THE INVENTION

Figure 1:
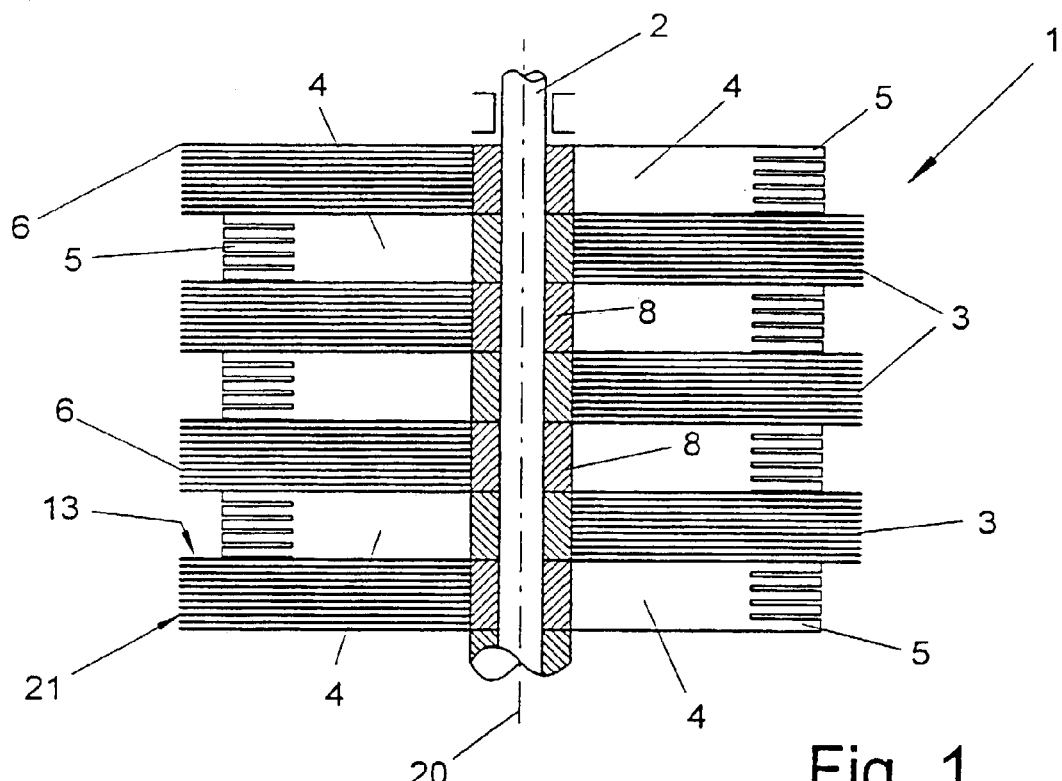
FIG. 1 shows a vertical section through a scrub brush with bristle-like bundles and strip-like wash elements arranged in an alternating manner in the circumferential direction.

In the example of FIG. 1, a washing device (1) is shown, which is configured in the preferred sample embodiment as a rotating scrub brush (1), especially a side brush. The carrying element of the scrub brush (1), such as a shaft (2), can turn essentially about the vertical axis and is driven by a motor. The mounting and the propulsion are consistent with the state of the art and require no further explanation.

In the sample embodiment there are several adjoining groove rings (8) attached in twist-lock manner in succession on the shaft (2). The groove rings (8) serve to accommodate strip-like wash elements (4) and bristle-like wash elements (3), which are preferably arranged in bundles (18).

Figure 3:
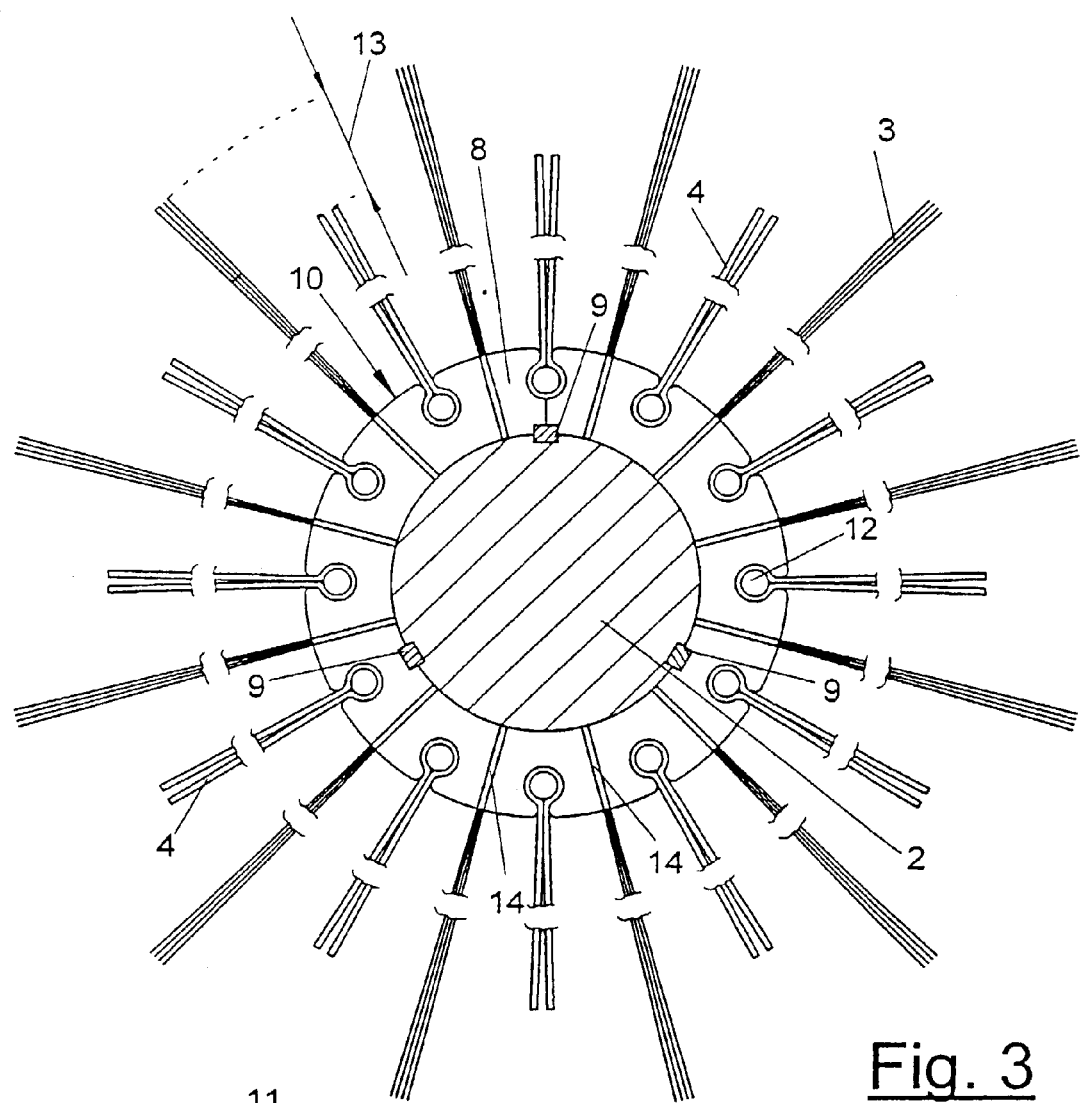
FIG. 3 shows a cross section through a scrub brush.
Figure 6:
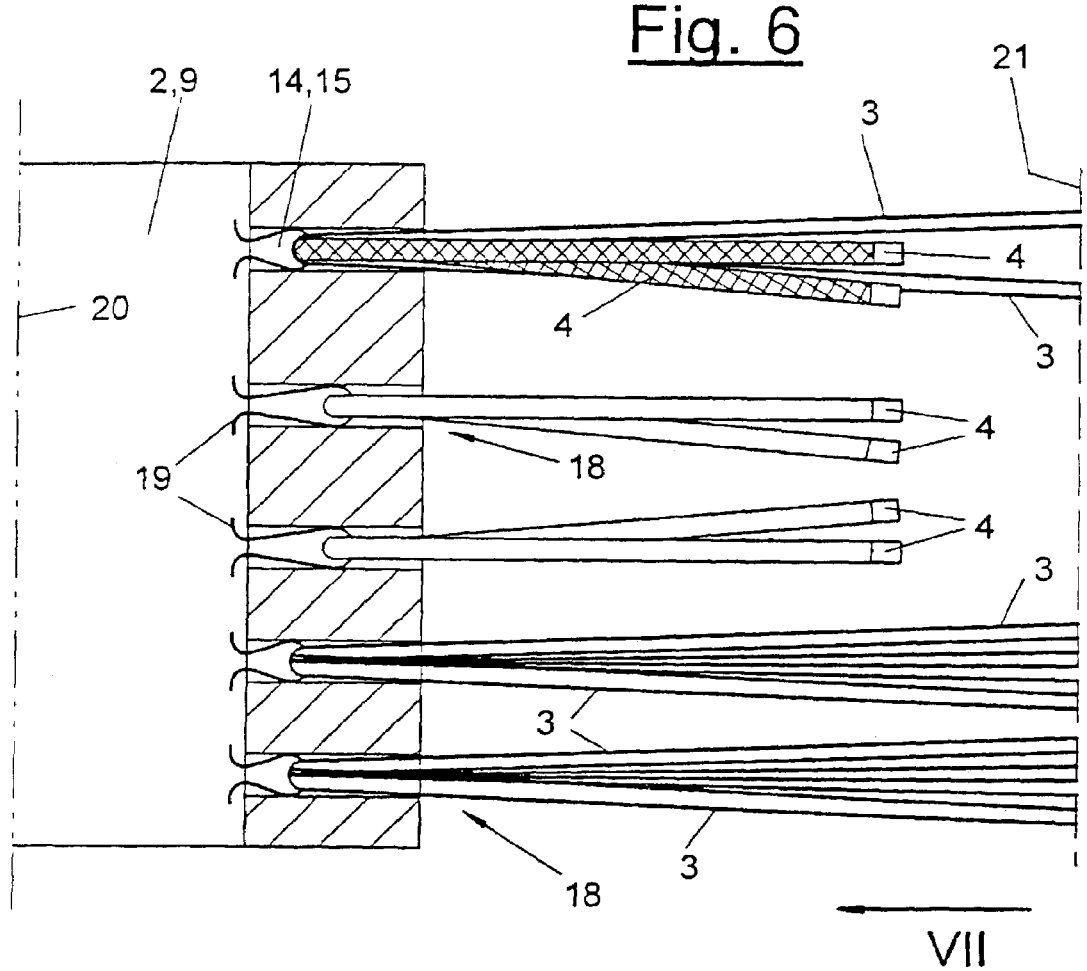
FIG. 6 shows a variant of the distribution and attachment of the wash elements.

The arrangement of the bristle-like wash elements (3) and the strip-like wash elements (4) occurs at the groove rings (8) in a closely-spaced alternation or a tight blending, as is especially evident from FIGS. 3 and 6. The alternation or alternating positioning of the different wash elements (3, 4) can be of various kinds. Preferably, there is an alternation at least in the circumferential direction of the scrub brush (1). In addition, an alternation in the axial direction (20) of the scrub brush (1) can occur. In the preferred embodiment, the different wash elements (3, 4) immediately follow each other. As an alternative, any other given pattern of alternation is also possible. For example, small groups of two strips (4) each alternate with groups of two bristle bundles (3, 18) each in the peripheral direction. The groups can also be of different size.

The strip-like wash elements (4) in the depicted example are configured as radially spaced cloths, having slits on their exterior edges, and thereby producing narrow strips (5). As an alternative, the wash elements (4) can also consist of individual thin strips or bundles or tufts (18) of individual strips.

The bristle-like wash elements (3) are longer than the strip-like wash elements (4). When stretched out, the tips (6) of the bristle-like wash elements (3) extend beyond the ends of the strip-like wash elements (4) or the slit strips (5) by the distance (13) (cf. FIG. 3). When the scrub brush (1) is rotating and freely unfolded, the projecting bristle-like wash elements (3) determine the outer circumference (21). Thus, the projecting bristle tips (6) are the first to make contact with the vehicle (16) and commence an intensive cleaning of the vehicle surfaces. The strip-like wash elements (4) then follow up, especially as the scrub brush (1) progressively penetrates deeper, and they complete the cleaning in a gentle manner.

The strip-like wash elements (4) consist of a soft, compressible material. They have a thickness of around 2 mm to 3 mm and in the preferred embodiment they are made from a closed-pore polyethylene foam, which takes up little water. As an alternative, they can also consist of a fibrous material, such as cloth or felt or any other suitable material.

The bristle-like wash elements (3), on the other hand, consist of a harder, thin threadlike synthetic material. For example, they are made of polyethylene and have an X-shaped cross section. Polyamide, polypropylene or other materials can also be considered as alternatives. The individual bristles (3) can be assembled into tufts (18) of bristles.

In the sample embodiment of FIG. 1, the alternating peripheral arrangement of bristle-like wash elements (3) and strip-like wash elements (4) extends over the entire length of the scrub brush (1). The peripheral distribution and positioning of the wash elements (3, 4) can remain the same for the length of the brush. But as an alternative, the additional alternation of the wash elements (3, 4) depicted in the drawing can also occur in the axial direction.

Figure 2:
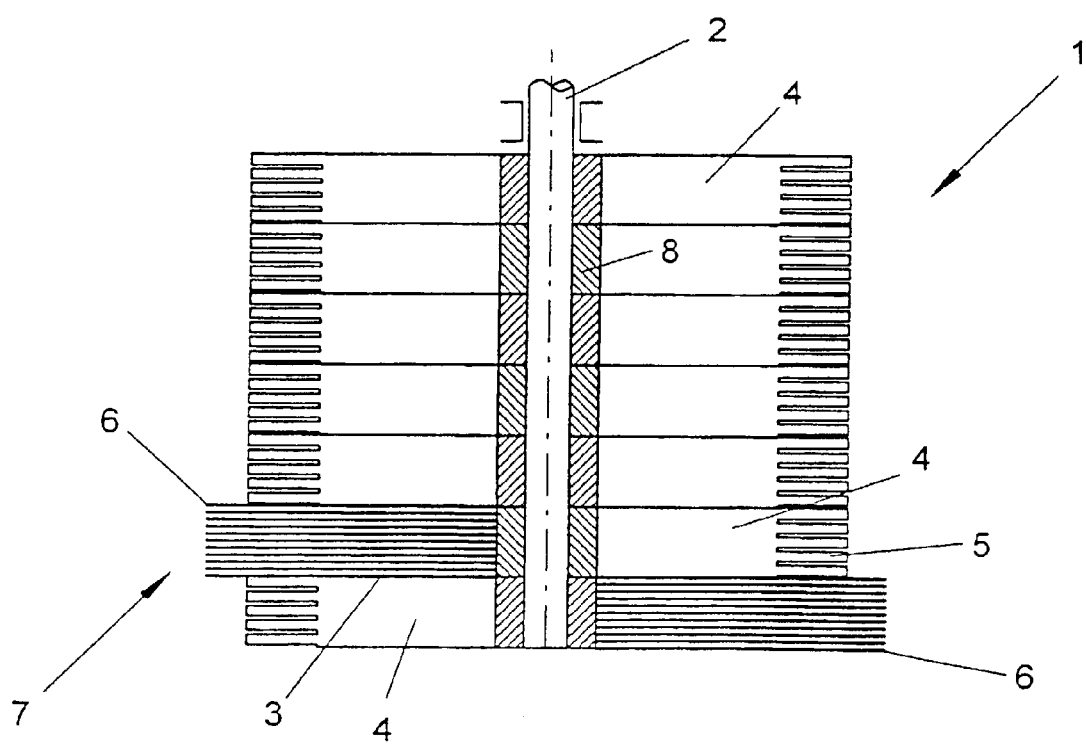
FIG. 2 shows a vertical section through a vertical washing brush with bristle bundles and strip-like wash elements distributed in the lower region.

FIG. 2 shows a variant in which the scrub brush (1) has alternately arranged groups of bristle-like wash elements (3) and groups of strip-like wash elements (4) only in its lower region (7). The alternation in this case, once again, can occur in the peripheral direction and additionally in the axial direction.

When such a scrub brush (1) per FIG. 2 is used as a side brush in car wash units, the lower regions (7) of the scrub brush (1) particularly work on the especially grimy zones of the vehicle, for example, the door sill region, and tough grime is removed due to the alternating arrangement of bristles (3) and strips (4). However, the paint surface is treated gently.

In the sample embodiment of FIG. 3, a scrub brush (1) is shown in cross section, on whose shaft (2) several groove rings (8) are arranged in succession, twist-locked by springs (9). For sake of clarity, the length of the wash elements (3, 4) is shown foreshortened. A plurality of axial grooves (11) is distributed uniformly at the outer periphery of the groove ring (8). In the example, there are twelve axial grooves (11) present, in which the folded strip-like wash elements (4) are introduced and held by means of lock pins (12).

Figure 4:
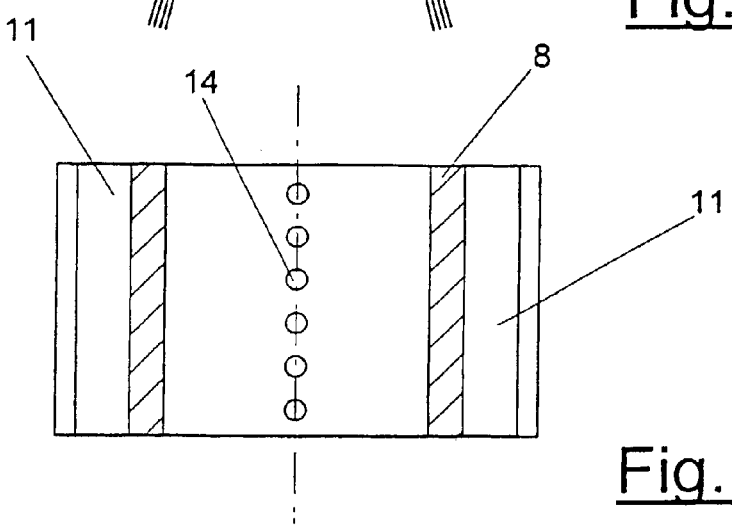
FIG. 4 shows a lengthwise section through a groove ring to accommodate bristle bundles and strip-like wash elements.

In the area between the grooves (11), there are twelve radial openings or boreholes (14), which are designed to accommodate the bristle bundles (3). The example of FIG. 4 shows that six boreholes (14) are arranged along a surface line of the groove ring (8) to accommodate the bristle tufts (18), so that there are twelve series of such bristle bundles distributed over the circumference.

In practice, it has proven to be advantageous to equip the bottom four groove rings (8) with the alternately arranged bristle bundles (3) and strip-like wash elements (4) in a vertical scrub brush per FIG. 2. Hence, FIG. 2 must not be taken as true to scale.

The number of radially projecting bristle threads per tuft (18) is 2×36, yet this specification as well must only be taken as an example.

The distance (13) between the tips (6) of the bristles (3) and the free ends of the strip-like wash elements (4) is around 5 cm in the sample embodiment. The strip-like wash elements (4), as in the state of the art (European Patent Application EU-A-0 934 710), are folded double and secured in the grooves (11) of the groove ring (8) by locking pins (12). The tips of these strip-like wash elements (4) are slitted to form strips (5) around 4 mm in width.

Figure 5:
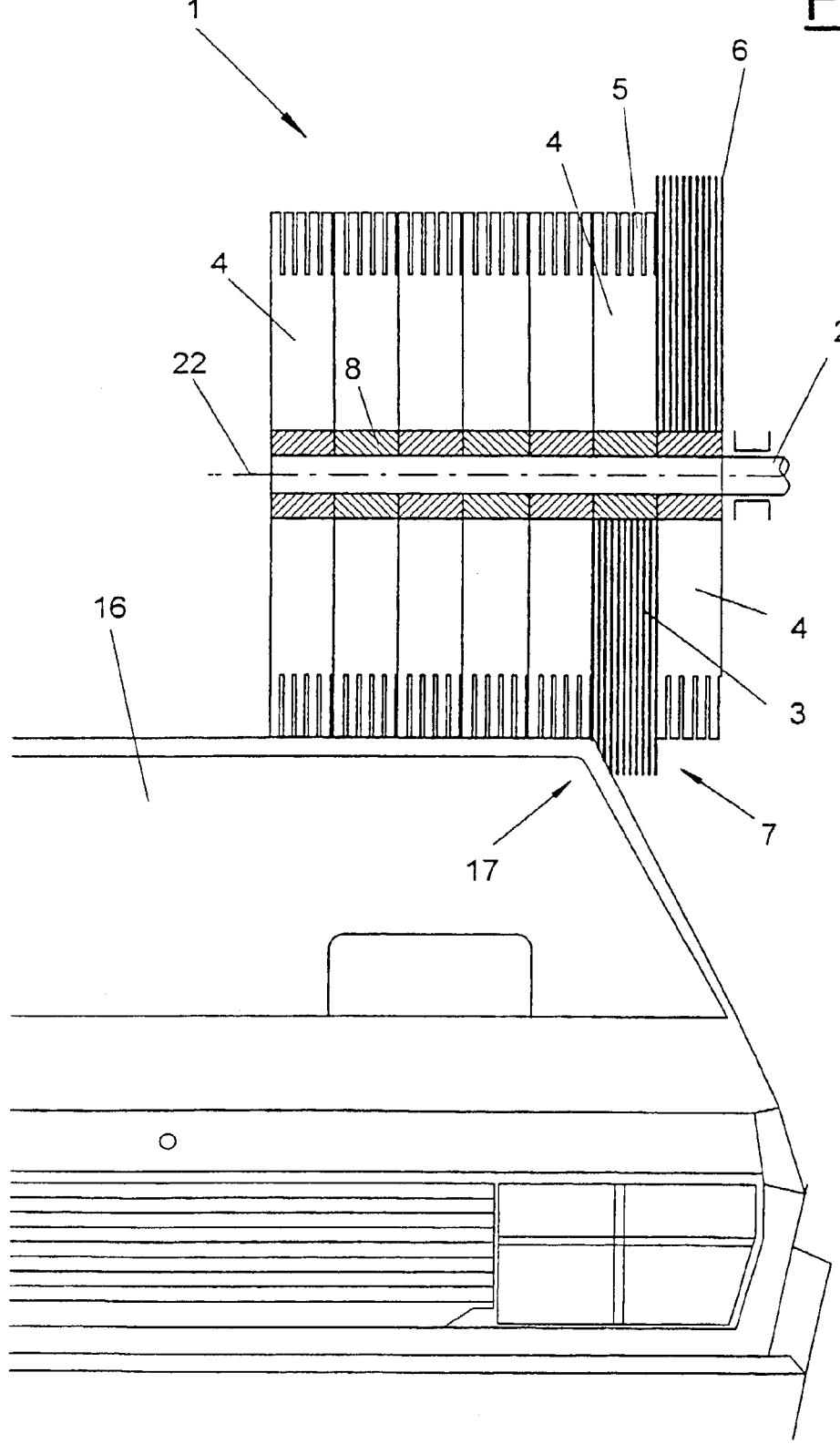
FIG. 5 shows a variant of FIG. 2 as a roof brush for a vehicle.

FIG. 5 shows a variant of FIG. 2, the scrub brush (1) being designed as a horizontal roof brush and being located in the washing position at a vehicle (16). This scrub brush (1) has areas (7) with peripherally alternating wash elements (3, 4) at both ends. The length of the region (7) can vary at will. In the sample embodiment shown, it comprises two groove rings (8). In this arrangement, the alternating washing elements (3, 4) are situated at the marginal areas of the vehicle and in particular at the roof edge regions (17) on both sides. In this way, the longer bristle-like washing elements (3) can especially easily reach the roof edge regions (17) and effectively wash them. This is especially advantageous at the roof junction zone and the sloping side surfaces of the vehicle body. Especially for vehicles with laterally recessed roofs, this supports the washing action of the side brushes, which cannot always optimally reach the slanting side surfaces of the body and especially the roof edge regions (17).

Figure 7:
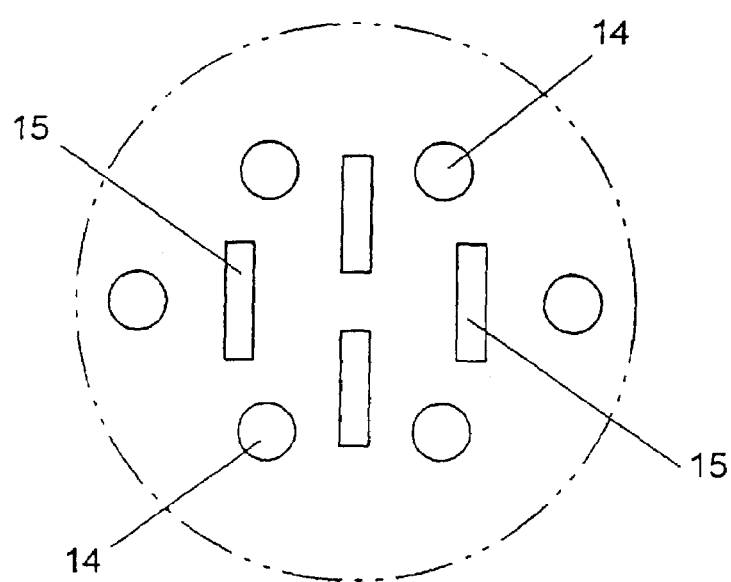
FIG. 7 shows a top view of an attachment per FIG. 6.

FIGS. 6 and 7 show a variant for the fastening technique and the positioning possibilities of the different wash elements (3, 4). FIG. 6 shows a lengthwise section through a groove ring (8) and a shaft (2). Its surface is provided with several radial boreholes (14, 15), in which the bristle-like wash elements (3) assembled into bundles (18) and also the strip-like wash elements (4) likewise presented here as individual strips and possibly also assembled into bundles (18) are secured. For the attachment, suitable fastening elements (19) are used at the inside end of the opening or borehole (14, 15), being configured as a staple or a strap and engaging with loops of the bundles (18) or the wash elements (3, 4).

FIG. 6 shows various positioning options. In the uppermost picture, bristles (3) and strips (4) are jointly secured in an opening (14, 15). In this case, all or only some of the openings (14, 15) of the fastening ring (8) or the shaft (2) can be outfitted in this manner. This variant is the closest packing of the alternately arranged or mingled wash elements (3, 4).

In the lower portion of FIG. 6, a different variant is shown. Here, the bristles (3) and strips (4) are arranged separately and each secured in their own openings (14, 15). As the picture shows, the alternating sequence here can be different from the preceding sample embodiments. There is a pattern of pairs, every two strips (4) or strip bundles (18) alternating with two bristles (3) or bristle bundles (18). The alternating sequence here is depicted in the axial direction of the lengthwise axis (20). But it can also exist additionally or alternatively in the circumferential direction. The openings (14, 15) can be arranged in uniform circumferential and axial rows.

FIG. 7 shows a variant for the configuration and arrangement of the openings (14, 15). The openings (14) are configured as cylindrical boreholes and serve here primarily to fasten bundles (18) of bristles (3). The other boreholes (15) have an essentially rectangular configuration in cross section and serve to secure individual strips (4) or small strip bundles (18). As the arrangement in FIG. 7 illustrates, there are four boreholes (15) provided for the strips (4), arranged in a cross and surrounded on the outside by six cylindrical boreholes (14) for the bristle bundles (18). This positioning pattern may repeat itself appropriately in the peripheral direction and/or the axial direction.

Various modifications of the depicted embodiments are possible. First, the materials and the distribution of the wash elements (3, 4) can vary at will. In the embodiment depicted, the peripheral distribution at each groove ring (8) is identical. As an alternative, it can also vary from one groove ring to another. In this case, not only the peripheral distribution and alternation pattern, but also the number of different wash elements (3, 4) can vary. The aforementioned axial alternation of the wash elements (3, 4) in the depicted embodiment is accomplished by a mutual twisting of the groove rings (8) each time by one peripheral alternation increment of the wash elements (3, 4). As an alternative, the outfitting of the groove rings (8) with the wash elements can also be appropriately twisted.

Furthermore, the fastening of the wash elements (3, 4) to the carrying element (2) can vary at will. Instead of the groove rings (8), other fastening elements can also be used, for example, ones consisting of rigid half-shell elements, elastic sleeves, or the like. The wash elements (3, 4) can also be fastened directly on the shaft (2) or another carrying element. Instead of groove fastenings, any other connection techniques can also be used.

In a further modification, the washing devices (1) also need not be configured as rotating scrub brushes with a rigid shaft (2) and a single axis of rotation. They can also have any other configuration and can consist of revolving bands with wash elements (3, 4) on the outside or any other design. There can also be several axes of rotation or movement in this case.

LIST OF REFERENCE NUMBERS

1 Washing device, scrub brush
2 Carrying element, shaft
3 Wash element, bristles
4 Wash element, strips
5 Slit strips
6 Tips of bristles
7 Lower region of scrub brush
8 Groove ring, fastening ring
9 Spring
10 Periphery
11 Groove
12 Locking pin
13 Spacing
14 Radial opening, borehole
15 Radial opening, borehole
16 Vehicle
17 Roof edge region
18 Bundle, tuft
19 Fastening element
20 Lengthwise axis, axial direction
21 Outer circumference

The invention claimed is:

1. A washing device for a car wash unit, the washing device mounted on a shaft and comprising:
a plurality of bristle element areas and a plurality of strip wash element areas independently positioned along the shaft of the washing device, each of the bristle element areas and the strip wash element areas being transversely spaced apart and arranged in an alternating manner such that at least one of the bristle element areas is positioned adjacent to at least one of the strip wash element areas,
wherein each of the plurality of bristle element areas includes a plurality of bristle elements and each of the plurality of strip wash element areas includes a strip wash element;
wherein the bristle elements have a greater length than the strip wash elements and the bristle elements are coarser than the strip wash elements; and
wherein at least two of the plurality of strip washer elements are located in a cross-section of the washer device perpendicular to the axis of the shaft.

2. The washing device of claim 1 wherein the strip wash elements are made of a plastic foam.

3. The washing device of claim 2 wherein the plastic foam is a closed-pore polyethylene foam.

4. The washing device of claim 1 wherein the strip wash elements are made of a fiber material.

5. The washing device of claim 4 wherein the fiber material is cloth or felt.

6. The washing device of claim 1 wherein the strip wash elements comprise individual thin strips or cloths with slits.

7. The washing device of claim 1 wherein the bristle and strip wash element areas are arranged in an alternating manner in a circumferential direction.

8. The washing device of claim 1 wherein the bristle and strip wash element areas are arranged in an alternating manner in an axial direction.

9. The washing device of claim 1 further comprising groove rings and wherein the bristle and strip wash elements are secured to the groove rings and wherein the bristle wash elements are configured as bristle tufts.

10. The washing device of claim 9 wherein the bristle wash elements are made of polyethylene, polyamide, or polypropylene.

11. The washing device of claim 1 further comprising groove rings arranged in twist-lock manner on the shaft and wherein the bristle and strip wash elements are secured to the groove rings.

12. The washing device of claim 1 wherein the washing device has upper and lower regions and the plurality of alternating bristle and strip wash element areas are located in the lower region.

13. The washing device of claim 1 further comprising groove rings arranged on the shaft and wherein at least one of the groove rings includes twelve rows of bristle wash elements and twelve rows of strip wash elements arranged in uniform alternation and distributed about the groove ring circumference.

14. The washing device of claim 1 wherein the bristle wash elements in a fully extended condition are around 5 cm longer than the strip wash elements.

15. The washing device of claim 1 wherein the bristle wash elements are fastened in radial openings on the washing device and arranged between axial grooves that accommodate the strip wash elements.

16. The washing device of claim 15 wherein the radial openings are on the shaft.

17. The washing device of claim 1 wherein each bristle wash element comprises a row of bristle tufts.

18. A washing device for a car wash unit, the washing device mounted on a shaft and comprising:

a plurality of bristle element areas and a plurality of strip wash element areas independently positioned on a periphery of the washing device, each of the bristle element areas and the strip wash element areas being transversely spaced apart and arranged in an alternating manner such that at least one of the bristle element areas is positioned adjacent to at least one of the strip wash element areas, wherein each of the plurality of bristle element areas includes a plurality of bristle elements and each of the plurality of strip wash element areas includes a strip wash element;

wherein the bristle elements have a greater length than the strip wash elements and the bristle elements are coarser than the strip wash elements; and wherein the washing device is a scrub brush and the bristle and strip wash elements are arranged in a lower region of the scrub brush rotating about a substantially vertical axis.

19. A washing device for a car wash unit, the washing device mounted on a shaft and comprising:

a plurality of bristle element areas and a plurality of tip wash element areas independently positioned on a periphery of the washing device, each of the bristle element areas and the strip wash element areas being transversely spaced apart and arranged in an alternating manner such that at least one of the bristle element areas is positioned adjacent to at least one of the strip wash element areas, wherein each of the plurality of bristle element areas includes a plurality of bristle elements and each of the plurality of strip wash element areas includes a strip wash element;

wherein the bristle elements have a greater length than the strip wash elements and the bristle elements are coarser than the strip wash elements; and wherein the washing device is a scrub brush and the bristle and strip wash elements are arranged on two end regions of the scrub brush rotating about a substantially horizontal axis.

20. A washing device for a car wash unit, the washing device mounted on a shaft and comprising:

a plurality of bristle element areas and a plurality of strip wash element areas independently positioned on a periphery of the washing device, each of the bristle element areas and the strip wash element areas being transversely spaced apart and arranged in an alternating manner such that at least one of the bristle element areas is positioned adjacent to at least one of the strip wash element areas, wherein each of the plurality of bristle element areas includes a plurality of bristle elements and each of the plurality of strip wash element areas includes a strip wash element;

wherein the bristle elements have a greater length than the strip wash elements and the bristle elements are coarser than the strip wash elements; and wherein the bristle wash elements and the strip wash elements are each arranged in bundles and are uniformly distributed peripherally and axially, and the bundles are secured in radial openings on the washing device.

21. The washing device of claim 20 wherein at least some of the radial openings contain both bristle and strip wash elements.

22. The washing device of claim 20 wherein the radial openings are on the shaft.

23. A washing device for a car wash unit, the washing device mounted on a shaft and comprising:

a plurality of bristle element areas and a plurality of strip wash element areas independently positioned along the shaft of the washing device, each of the bristle element areas and the strip wash element areas being transversely spaced apart and arranged in an alternating manner such that at least one of the bristle element areas is positioned adjacent to at least one of the strip wash element areas, wherein each of the plurality of bristle element areas includes a plurality of bristle elements and each of the plurality of strip wash element areas includes a strip wash element;

wherein the bristle elements have a greater length than the strip wash elements and the bristle elements are coarser than the strip wash elements; and wherein at least one end region of the washing device includes a first and second strip wash element spaced from the opposite end of the shaft.

* * * * *